United States Patent

Takakura et al.

[11] Patent Number: 5,856,417
[45] Date of Patent: Jan. 5, 1999

[54] FLUORINE-CONTAINING COPOLYMER

[75] Inventors: Teruo Takakura; Atsushi Funaki; Naomi Ichikuni, all of Yokohama, Japan

[73] Assignee: Asahi Glass Company Ltd., Tokyo, Japan

[21] Appl. No.: 958,165

[22] Filed: Oct. 27, 1997

[30] Foreign Application Priority Data

Oct. 29, 1996 [JP] Japan .................................. 8-287092

[51] Int. Cl.$^6$ ...................................................... C08F 16/24
[52] U.S. Cl. .......................................... 526/247; 526/255
[58] Field of Search ..................................... 526/247, 255

[56] References Cited

U.S. PATENT DOCUMENTS

| | | | |
|---|---|---|---|
| 4,920,170 | 4/1990 | Abe et al. | 526/247 |
| 4,954,588 | 9/1990 | Oka et al. | 526/247 |
| 5,037,921 | 8/1991 | Carlson | 526/247 |

FOREIGN PATENT DOCUMENTS

| | | | |
|---|---|---|---|
| 0075312 | 3/1983 | European Pat. Off. | 526/247 |
| 0525687 | 2/1993 | European Pat. Off. | 526/247 |

*Primary Examiner*—Jeffrey T. Smith
*Assistant Examiner*—N. Sarofim
*Attorney, Agent, or Firm*—Oblon, Spivak, McClelland, Maier & Neustadt, P.C.

[57] ABSTRACT

A fluorine-containing copolymer comprising:

(a) from 0.05 to 20 mol % of polymer units based on at least one fluorinated comonomer selected from the group consisting of fluorinated comonomers of the following formulae (1), (2) and (3):

$$X-R^f-CY=CH_2 \qquad (1)$$

$$X-R^f-O-CF=CF_2 \qquad (2)$$

$$CF_3-(CF_2)_n-(O-CF(CF_3)-CF_2)_m-O-CF=CF_2 \qquad (3)$$

wherein Y is a fluorine atom or a hydrogen atom, $R^f$ is a $C_{2-12}$ bivalent fluorinated organic group, X is a fluorine atom, a chlorine atom or a hydrogen atom, n is an integer of from 0 to 3, and m is an integer of from 1 to 4, (b) from 30 to 85 mol % of polymer units based on tetrafluoroethylene, (c) from 1 to 30 mol % of polymer units based on propylene, and (d) from 5 to 68.5 mol % of polymer units based on vinylidene fluoride.

9 Claims, No Drawings

FLUORINE-CONTAINING COPOLYMER

BACKGROUND OF THE INVENTION

1. Field of the Invention

The present invention relates to a thermoplastic fluorine-containing copolymer having flexibility.

2. Discussion of Background

A thermoplastic fluorine-containing copolymer having flexibility and excellent moldability is desired in the field of tubes, sealing materials, films or composite materials thereof. A copolymer of tetrafluoroethylene (hereinafter referred to as TFE) and propylene, which contains at most 60 mol % of polymer units based on TFE, is known as an elastomer.

A three-component copolymer comprising TFE, polypropylene and vinylidene fluoride (hereinafter referred to as VDF) is known as an elastomer.

Further, a copolymer of a fluorinated comonomer of the formula (2) or (3) given hereinafter with TFE or VDE is known as an elastomer.

For example, JP-A-50-50488 discloses a three-component copolymer comprising from 50 to 65 mol % of polymer units based on TFE, from 20 to 45 mol % of polymer units based on propylene and from 5 to 26 mol % of polymer units based on VDF.

JP-A-52-44895 discloses a three-component copolymer comprising from 5 to 50 mol % of polymer units based on TFE, from 5 to 40 mol % of polymer units based on propylene and from 30 to 90 mol % of polymer units based on VDF.

Further, JP-A-52-45685 discloses a three-component copolymer comprising from 25 to 50 mol % of polymer units based on TFE, from 25 to 45 mol % of polymer units based on propylene and from 10 to 30 mol % of polymer units based on VDF.

JP-A-58-71906 discloses a copolymer comprising from 50 to 88 mol % of polymer units based on a fluoroolefin such as TFE or VDF and from 12 to 50 mol % of polymer units based on the comonomer of the formula (3) as defined in the present invention.

Further, JP-A-1-22908 discloses a three-component copolymer comprising from 30 to 80 mol % of polymer units based on TFE, from 5 to 60 mol % of polymer units based on the copolymer of the formula (2) as defined in the present invention, and from 3 to 50 mol % of polymer units based on the comonomer of the formula (3) as defined in the present invention. Such a copolymer is described to be a resilient copolymer having excellent low temperature characteristics.

These copolymers are excellent in flexibility. However, their molded products are elastomeric and, as such, can not practically be used unless they are vulcanized.

On the other hand, a two-component copolymer comprising TFE and VDF is known to be a thermoplastic resin having a melting point of from 150° to 300° C., but it does not have flexibility (Polymer Science USSR A18, No. 12, p2691–2699).

Accordingly, it is conceivable that by increasing the content of polymer units based on TFE and decreasing the content of polymer units based on propylene in a three-component copolymer comprising TFE, propylene and VDF, it may be possible to obtain a copolymer having a thermoplastic nature while maintaining flexibility.

In fact, a copolymer comprising from 40 to 80 mol % of polymer units based on TFE, from 5 to 25 mol % of polymer units based on propylene and from 10 to 55 mol % of polymer units based on VDF, has been confirmed to be a thermoplastic fluorine resin which has flexibility and which has a melting point of from about 130° to about 200° C.

A thermoplastic resin is usually required to have a low melt viscosity for extrusion. However, with the above three-component copolymer, it has been found that if it has a low melt viscosity, the mechanical properties, particularly the tensile strength and the tensile elongation at a high temperature, deteriorate.

SUMMARY OF THE INVENTION

It is an object of the present invention to provide a novel thermoplastic fluorine-containing copolymer excellent in high temperature mechanical properties and flexibility.

The present inventors have conducted various studies to solve the above problems and as a result, have found that a fluorine-containing copolymer having polymer units based on a fluorinated comonomer as described hereinafter incorporated to a thermoplastic fluorine resin system comprising polymer units based on TFE, propylene and VDF, is a thermoplastic resin having adequate mechanical properties, particularly excellent high temperature mechanical properties, and desired flexibility. The present invention has been accomplished on the basis of this discovery. It, is believed that with the fluorine-containing copolymer having a fluorinated comonomer having a relatively large side chain introduced, the crystallinity has decreased, and entanglement of molecular chains to one another has increased, whereby high temperature mechanical properties have been improved.

That is, the present invention provides a fluorine-containing copolymer comprising:

(a) from 0.05 to 20 mol % of polymer units based on at least one fluorinated comonomer selected from the group consisting of fluorinated comonomers of the following formulae (1), (2) and (3):

$$X-R^f-CY=CH_2 \qquad (1)$$

$$X-R^f-O-CF=CF_2 \qquad (2)$$

$$CF_3-(CF_2)_n-(O-CF(CF_3)-CF_2)_m-O-CF=CF_2 \qquad (3)$$

wherein Y is a fluorine atom or a hydrogen atom, $R^f$ is a $C_{2-12}$ bivalent fluorinated organic group, X is a fluorine atom, a chlorine atom or a hydrogen atom, n is an integer of from 0 to 3, and m is an integer of from 1 to 4, (b) from 30 to 85 mol % of polymer units based on TFE, (c) from 1 to 30 mol % of polymer units based on propylene, and (d) from 5 to 68.5 mol % of polymer units based on VDF.

DETAILED DESCRIPTION OF THE PREFERRED EMBODIMENTS

The content of polymer units based on TFE in the fluorine-containing copolymer of the present invention is from 30 to 85 mol %. If TFE is less than this range, the decomposition temperature tends to be low, and the moldability tends to be impaired. On the other hand, if the content of polymer units based on TFE exceeds the above range, the polymer units based on TFE or the polymer units based on TFE-VDF tend to crystallize, whereby flexibility will be lost.

The content of polymer units based on propylene is from 1 to 30 mol %. If propylene is less than this range, the flexibility tends to be low, and if it exceeds this range, the copolymer tends to be elastomeric.

The content of polymer units based on VDF is from 5 to 68.5 mol %. The content of the fluorinated comonomer is from 0.05 to 20 mol %. If it is less than this range, the mechanical properties tend to be poor, and if it exceeds this range, the polymerization rate tends to be slow, whereby the productivity will be poor.

The fluorine-containing copolymer preferably has a volumetric flow rate within a range of from 1 to 10 (mm$^3$/sec), as an index for the molecular weight. The volumetric flow rate is the volume of a molten sample extruded per unit time (mm$^3$/sec) from a nozzle having a diameter of 1 mm and a length of 2 mm under a load of 7 kg at 200° C.

A preferred construction of the fluorine-containing copolymer of the present invention comprises:

(a) from 0.1 to 15 mol % of polymer units based on the fluorinated comonomer, (b) from 40 to 75 mol % of polymer units based on TFE, (c) from 5 to 25 mol % of polymer units based on propylene, and (d) from 10 to 54.5 mol % of polymer units based on VDF.

As the fluorinated comonomer, one member selected from the group consisting of fluorinated comonomers of the formulae (1), (2) and (3), may be used, or two or more of them may be used in combination.

In the bivalent fluorinated organic group for $R^f$ in the formula (1) or (2), the number of substituted fluorine atoms may be at least 1. A completely fluorinated bivalent organic group is particularly preferred. $R^f$ is preferably a bivalent fluorinated organic group wherein the chain is constituted by carbon atoms only, or carbon and oxygen atoms.

Specifically, $R^f$ may, for example, be a perfluoroalkylene group or a perfluoroalkylene group containing an ether bond. The number of carbon atoms constituting the chain for $R^f$ is from 2 to 12, preferably from 2 to 10. $R^f$ is preferably of a straight chain structure, but may be of a branched structure. In the case of a branched structure, the branched moiety is preferably a short chain having from 1 to 3 carbon atoms.

As the fluorinated comonomer, a (perfluoroalkyl)ethylene such as (perfluorobutyl)ethylene, (perfluorohexyl)ethylene or (perfluorooctyl)ethylene, a perfluoro(alkyl vinyl ether) such as perfluoro(methyl vinyl ether), perfluoro(ethyl vinyl ether) or perfluoro(propyl vinyl ether), or a compound of the formula (3) wherein n is 1 or 2, and m is 1 or 2, is preferably used.

When one fluorinated comonomer is used, a four component copolymer thereof with TFE, propylene and VDF will be obtained. When two or more fluorinated comonomers are used, it is believed that such fluorinated comonomers are mutually copolymerized to form a five-component copolymer or a copolymer having a higher multi-component structure.

Further, in addition to the above fluorinated comonomers, other copolymerizable components, such as ethylene, isobutylene, acrylic acid and its esters, metacrylic acid and its esters, chlorotrifluoroethylene, alkyl vinyl ethers such as ethyl vinyl ether and butyl vinyl ether, and vinyl esters such as vinyl acetate and vinyl benzoate, may be copolymerized. The content of polymer units based on these other copolymerizable monomers in the fluorine-containing copolymer is preferably not higher than 10 mol % in order to maintain the excellent properties of the fluorine-containing copolymer.

A particularly preferred construction of the fluorine-containing copolymer of the present invention comprises from 0.2 to 5 mol % of polymer units based on the fluorinated comonomer, from 45 to 75 mol % of polymer units based on TFE, from 8 to 20 mol % of polymer units based on propylene, from 10 to 40 mol % of polymer units based on VDF, and from 0 to 5 mol % of polymer units based on copolymerizable components other than the fluorinated comonomer.

As the polymerization method for preparing the fluorine-containing copolymer, any one of emulsion polymerization, suspension polymerization and solution polymerization may be employed. For example, the solution polymerization may be conducted in a fluorine-type solvent such as hydrofluorocarbon or hydrochlorofluorocarbon or in an alcohol type solvent such as tertiary butanol at a temperature of from −40° C. to +150° C. under a relatively low reaction pressure such as from 1 to 50 kg/cm$^2$.

The suspension polymerization or emulsion polymerization can be carried out in an aqueous medium. For example, the emulsion polymerization can be conducted at a temperature of from 50° to 100° C. under a pressure of from 5 to 200 kg/cm$^2$ using a surfactant such as ammonium perfluorooctanoate or sodium lauryl sulfate, a polymerization initiator such as a peroxide, an azo compound or a persulfate, and optionally, a pH controlling agent such as phosphoric acid-phosphate or oxalic acid-oxalate, and a molecular weight controlling agent such as methanol, secondary butanol or pentane. Otherwise, by using a redox type initiator, such as ammonium persulfate, potassium persulfate, a combination of sodium persulfate and a sulfite or thiosulfate, or such a sulfite or thiosulfate and a salt of copper or iron, emulsion polymerization can be carried out at a low temperature of from −20° C. to +50° C.

In the emulsion polymerization, after completion of the reaction, freezing or coagulation by an addition of an electrolyte is carried out, followed by centrifugal separation or filtration to separate a latex of the fluorine-containing copolymer.

The fluorine-containing copolymer of the present invention can be used for various molded products or as a material for lining or coating electric wires. Especially, by virtue of its high flexibility, covered wires or tubes may be applied to complicated wirings or pipings, or to a place where vigorous movements are involved. Further, it has transparency, so that it is useful in the form of a film, for example, as a film for agricultural use excellent in weather resistance or as a cover for a solar cell, or as an interlayer for laminated glass utilizing its flame retardancy.

Now, the present invention will be described in further detail with reference to Examples. However, it should be understood that the present invention is by no means restricted to such specific Examples.

EXAMPLE 1

To a deaerated stainless steel autoclave having an internal capacity of 1 l and equipped with a stirrer, 635 g of deionized water, 5 g of ammonium perfluorooctanoate, 14.9 g of TFE, 1.4 g of propylene, 9.7 g of VDF and 1.2 g of (perfluorobutyl)ethylene were charged, and the temperature was raised to 80° C. Then, 5 ml of a 30% ammonium persulfate aqueous solution was injected to initiate polymerization. To supplement the pressure which decreased as the reaction progressed, a gas mixture comprising TFE/propylene/VDF in a molar ratio of 58/10/32, was introduced, and the reaction was continued under a pressure of 18.3 kg/cm$^2$G.

(Perfluorobutyl)ethylene was added in an amount of 0.1 ml per 3 g of the gas mixture, and the reaction was continued for 8 hours.

After completion of the reaction, the monomers in the reactor were purged to obtain 840 g of a latex. Sulfuric acid was dropwise added to this latex for coagulation, followed by washing and drying to obtain 194 g of copolymer a. With respect to copolymer a, the composition (mol ratio) was analyzed by $^{19}$FNMR and $^{1}$HNMR, the melting point (°C.) was measured by DSC, and the volumetric flow rate (mm$^3$/sec) as an index for the molecular weight, was measured. The results are shown in Table 1.

Further, the tensile modulus of elasticity (MPa), the tensile strength (kg/cm$^2$) at 25° C. and 100° C. and the tensile elongation (%) of the compression molded product of copolymer a are shown in Table 1.

EXAMPLE 2

To a deaerated stainless steel autoclave having an internal capacity of 1 l and equipped with a stirrer, 615 g of deionized water, 5 g of ammonium perfluorooctanoate, 2.48 g of ammonium oxalate hydrate, 0.82 g of oxalic acid dihydrate, 20 g of TFE, 2 g of propylene, 13 g of VDF and 0.77 g of (perfluorobutyl)ethylene were charged, and the temperature was raised to 50° C. Then, 12 ml of a 3.8% potassium permanganate aqueous solution was injected to initiate polymerization. To supplement the pressure which decreased as the reaction progressed, a gas mixture comprising TFE/propylene/VDF in a molar ratio of 58/10/32, was introduced, and the reaction was continued under a pressure of 17.8 kg/cm$^2$G.

(Perfluorobutyl)ethylene was added in an amount of 0.1 ml per 5 g of the gas mixture.

The aqueous potassium permanganate solution was intermittently charged so that the polymerization rate became substantially constant. It was charged in a total amount of 61 ml. After 10.5 hours, the monomers in the reactor were purged to obtain 830 g of a latex. Sulfuric acid was dropwise added to this latex for coagulation, followed by washing and drying to obtain 168 g of copolymer b. The physical properties and mechanical properties of copolymer b were measured in the same manner as in Example 1, and the results are shown in Table 1.

EXAMPLE 3

To a deaerated stainless steel autoclave having an internal capacity of 1 l and equipped with a stirrer, 610 g of deionized water, 3.6 g of ammonium perfluorooctanoate, 14.8 g of disodium hydrogenphosphate 12 hydrate, 1.59 g of sodium hydroxide, 3 g of ammonium persulfate, 0.11 g of iron sulfate, 0.10 g of ethylene diamine tetracetate and 1.8 g of 2-butanol were charged. Then, 22.6 g of TFE, 3.5 g of propylene, 16.0 g of VDF and 1.3 g of (perfluorooctyl) ethylene were charged, and the temperature was maintained at 25° C. Then, 2 ml of a solution containing 1.76 g of sodium hydroxide and 0.29 g of Rongalite per 10 ml of water, was injected to initiate polymerization.

To supplement the pressure which decreased as the reaction progressed, a gas mixture comprising TFE/propylene/VDF in a molar ratio of 53/10/37, was introduced, and the reaction was continued under a pressure of 20.3 kg/cm$^2$G. (Perfluorooctyl)ethylene was added in an amount of 0.1 ml per 5 g of the gas mixture, and the reaction was continued for 11 hours. After completion of the reaction, the monomers in the reactor were purged to obtain 827 g of a latex. Sulfuric acid was dropwise added to this latex for coagulation, followed by washing and drying to obtain 187 g of copolymer c. The physical properties and mechanical properties of copolymer c were measured in the same manner as in Example 1, and the results are shown in Table 1.

EXAMPLE 4

To a deaerated stainless steel autoclave having an internal capacity of 1 l and equipped with a stirrer, 635 g of deionized water, 2 g of ammonium perfluorooctanoate, 23.2 g of TFE, 0.9 g of propylene, 6.9 g of VDF and 10.7 g (10.0 mol %) of perfluoro(propyl vinyl ether) were charged, and the temperature was raised to 70° C. Then, 6 ml of a 30% ammonium persulfate aqueous solution was injected to initiate polymerization. To supplement the pressure which decreased as the reaction progressed, a gas mixture comprising TFE/propylene/VDF in a molar ratio of 65/15/20, was introduced, and the reaction was continued under a pressure of 16.2 kg/cm$^2$G. After 9.5 hours, the monomers in the reactor were purged to obtain 824 g of a latex. Sulfuric acid was dropwise added to this latex for coagulation, followed by washing and drying to obtain 176 g of copolymer d. The physical properties and mechanical properties of copolymer c were measured in the same manner as in Example 1, and the results are shown in Table 1.

EXAMPLE 5

To a deaerated stainless steel autoclave having an internal capacity of 20 l and equipped with a stirrer, 11.8 kg of deionized water, 575 g of t-butanol, 96 g of methanol, 60 g of ammonium perfluorooctanoate, 266 g of TFE, 29 g of propylene, 233 g of VDF, and 16.3 g (0.8 mol %) of $CF_3(OCF(CF_3)CF_2)OCF{=}CF_2$ (a compound of the formula (3) wherein n=0 and m=1, hereinafter referred to as the perfluoro(alkyl vinyl ether)), were charged, and the temperature was raised to 70° C. Then, 180 ml of a 30% ammonium persulfate aqueous solution was injected to initiate polymerization. To supplement the pressure which decreased as the reaction progressed, a gas mixture comprising TFE/propylene/VDF in a molar ratio of 44/12/44, was introduced, and the reaction was continued under a pressure of 17.4 kg/cm$^2$G. The perfluoro(alkyl vinyl ether) was added in an amount of 0.1 ml per 7 g of the gas mixture, and the reaction was continued for 7.7 hours. Then, the monomers in the reactor were purged to obtain 14.7 kg of a latex. Ammonium chloride was dropwise added to this latex for coagulation, followed by washing and drying to obtain 2.1 kg of copolymer e. The physical properties and mechanical properties of copolymer e were measured in the same manner as in Example 1, and the results are shown in Table 1.

EXAMPLE 6

To a deaerated stainless steel autoclave having an internal capacity of 20 l and equipped with a stirrer, 11.8 kg of deionized water, 158 g of methanol, 60 g of ammonium perfluorooctanoate, 210 g of TFE, 24 g of propylene, 243 g of VDF, and 37.4 g (1.5 mol %) of (perfluorooctyl)ethylene were changed, and the temperature was raised to 70° C. Then, 210 ml of a 30% ammonium persulfate aqueous solution was injected to initiate polymerization. To supplement the pressure which decreased as the reaction progressed, a gas mixture comprising TFE/propylene/VDF in a molar ratio of 35/8/57, was introduced, and the reaction was continued under a pressure of 18.2 kg/cm$^2$G. (Perfluorooctyl)ethylene was added in an amount of 0.1 ml per 2 g of the gas mixture, and the reaction was continued for 11.3 hours. Then, the monomers in the reactor were purged to obtain 14.1 kg of a latex. Ammonium chloride was dropwise added to this latex for coagulation, followed by washing and drying to obtain 2.0 kg of copolymer f. The physical properties and mechanical properties of copolymer f were measured in the same manner as in Example 1, and the results are shown in Table 1.

EXAMPLE 7

To a deaerated stainless steel autoclave having an internal capacity of 20 l and equipped with a stirrer, 11.8 kg of deionized water, 520 g of t-butanol, 135 g of methanol, 50 g of ammonium perfluorooctanoate, 399 g of TFE, 44 g of propylene, 125 g of VDF, and 35 g (3.0 mol %) of perfluoro (propyl vinyl ether) were charge, and the temperature was raised to 70° C. Then, 180 ml of a 30% ammonium persulfate aqueous solution was injected to initiate polymerization. To supplement the pressure which decreased as the reaction progressed, a gas mixture comprising TFE/propylene/VDF in a molar ratio of 65/20/15, was introduced, and the reaction was continued under a pressure of 17.6 kg/cm$^2$G. Perfluoro (propyl vinyl ether) was added in an amount of 0.1 ml per 5 g of the gas mixture, and the reaction was continued for 9.6 hours. Then, the monomers in the reactor were purged to obtain 15.2 kg of a latex. Ammonium chloride was dropwise added to this latex for coagulation, followed by washing and drying to obtain 2.3 kg of copolymer g. The physical properties and mechanical properties of copolymer g were measured in the same manner as in Example 1, and the results are shown in Table 1.

EXAMPLE 8 (COMPARATIVE EXAMPLE)

To a deaerated stainless steel autoclave having an internal capacity of 1 l and equipped with a stirrer, 635 g of deionized water, 5 g of ammonium perfluorooctanoate, 14.9 g of TFE, 1.4 g of propylene, 9.7 g of VDF were charged, and the temperature was raised to 80° C. Then, 5 ml of a 30% ammonium persulfate aqueous solution was injected to initiate polymerization. To supplement the pressure which decreased as the reaction progressed, a gas mixture comprising TFE/propylene/VDF in a molar ratio of 58/10/32, was introduced, and the reaction was continued for 6.5 hours under a pressure of 18.0 kg/cm$^2$G. After completion of the reaction, the monomers in the reactor were purged to obtain 830 g of a latex. Sulfuric acid was dropwise added to this latex for coagulation, followed by washing and drying to obtain 182 g of copolymer h. The physical properties and mechanical properties of copolymer h were measured in the same manner as in Example 1, and the results are shown in Table 1.

EXAMPLE 9 (COMPARATIVE EXAMPLE)

To a deaerated stainless steel autoclave having an internal capacity of 1 l and equipped with a stirrer, 610 g of deionized water, 3.6 g of ammonium perfluorooctanoate, 14.8 g of disodium hydrogenphosphate 12 hydrate, 1.59 g of sodium hydroxide, 3 g of ammonium persulfate, 0.11 g of iron sulfate, 0.10 g of ethylenediamine tetracetate and 1.8 g of 2-butanol were charged. Then, 22.6 g of TFE, 3.5 g of propylene and 16.0 g of VDF were charged, and the temperature was maintained at 25° C. Then, 2 ml of a solution containing 1.76 g of sodium hydroxide and 0.29 g of Rongalite per 10 ml of water, was injected to initiate polymerization.

To supplement the pressure which decreased as the reaction progressed, a gas mixture comprising TFE/propylene/VDF in a molar ratio of 53/10/37, was introduced, and the reaction was continued under a pressure of 20.1 kg/cm$^2$G. After 10 hours, the monomers in the reactor were purged to obtain 841 g of a latex. Sulfuric acid was dropwise added to this latex for coagulation, followed by washing and drying to obtain 202 g of copolymer i. The physical properties and mechanical properties of copolymer i were measured in the same manner as in Example 1, and the results are shown in Table 1.

TABLE 1

| Example No. | 1 | 2 | 3 | 4 | 5 |
|---|---|---|---|---|---|
| Composition | | | | | |
| TFE | 59.9 | 58.6 | 53.8 | 70.9 | 44.3 |
| Propylene | 11.4 | 12.2 | 13.8 | 9.7 | 13.1 |
| VDF | 27.3 | 28.5 | 32.0 | 15.6 | 41.9 |
| PFBE | 1.4 | 0.7 | — | — | — |
| PFOE | — | — | 0.4 | — | — |
| PPVE | — | — | — | 3.9 | — |
| PAVE | — | — | — | — | 0.7 |
| Melting point | 139 | 144 | 141 | 136 | 113 |
| Volumetric flow rate | 2.8 | 7.4 | 3.2 | 1.0 | 0.8 |
| Tensile modulus of elasticity At 25° C. | 230 | 220 | 180 | 89 | 117 |
| Tensile strength | 236 | 171 | 218 | 181 | 195 |
| Tensile elongation (%) At 100° C. | 466 | 496 | 487 | 460 | 524 |
| Tensile strength | 30 | 27 | 29 | 21 | 25 |
| Tensile elongation (%) | 1052 | 688 | 884 | 476 | 729 |

| Example No. | 6 | 7 | 8 | 9 |
|---|---|---|---|---|
| Composition | | | | |
| TFE | 37.8 | 67.4 | 60.7 | 54.7 |
| Propylene | 7.8 | 19.7 | 9.7 | 15.4 |
| VDF | 53.2 | 11.8 | 29.6 | 29.9 |
| PFBE | — | — | — | — |
| PFOE | 1.2 | — | — | — |
| PPVE | — | 1.1 | — | — |
| PAVE | — | — | — | — |
| Melting point | 107 | 154 | 142 | 149 |
| Volumetric flow rate | 2.2 | 5.7 | 1.8 | 0.9 |
| Tensile modulus of elasticity At 25° C. | 102 | 247 | 190 | 210 |
| Tensile strength | 184 | 251 | 106 | 121 |
| Tensile elongation (%) At 100° C. | 549 | 457 | 192 | 468 |
| Tensile strength | 19 | 34 | 17 | 19 |
| Tensile elongation (%) | 692 | 869 | 62 | 88 |

PFBE: (Perfluorobutyl)ethylene
PFOE: (Perfluorooctyl)ethylene
PPVE: Perfluoro(propyl vinyl ether)
PAVE: $CF_3(OCF(CF_3)CF_2)OCF = CF_2$ As described in the foregoing, the thermoplastic fluorine-containing copolymer of the present invention obtained by polymerizing TFE, propylene, VDF and, as the fourth component, at least one fluorinated comonomer selected from those of the formulae (1), (2) and (3), has flexibility, transparency and excellent high temperature mechanical properties.

What is claimed is:
1. A fluorine-containing copolymer comprising:
(a) from 0.05 to 20 mol % of polymer units based on at least one fluorinated comonomer selected from the group consisting of fluorinated comonomers of the following formulae (1), (2) and (3):

$$X-R^f-CY=CH_2 \quad (1)$$

$$X-R^f-O-CF=CF_2 \quad (2)$$

$$CF_3-(CF_2)_n-(O-CF(CF_3)-CF_2)_m-O-CF=CF_2 \quad (3)$$

wherein Y is a fluorine atom or a hydrogen atom, $R^f$ is a $C_{2-12}$ bivalent fluorinated organic group, X is a fluorine atom, a chlorine atom or a hydrogen atom, n is an integer of from 0 to 3, and m is an integer of from 1 to 4, (b) from 30 to 85 mol % of polymer units based on tetrafluoroethylene, (c) from 1 to 30 mol % of polymer units based on propylene, and (d) from 5 to 68.5 mol % of polymer units based on vinylidene fluoride.

2. The fluorine-containing copolymer according to claim 1, wherein the fluorinated comonomer of the formula (1) is (perfluorobutyl)ethylene or (perfluorooctyl)ethylene.

3. The fluorine-containing copolymer according to claim 1, wherein the fluorinated comonomer of the formula (2) is perfluoro(propyl vinyl ether).

4. The fluorine-containing copolymer according to claim 1, which comprises:

(a) from 0.1 to 15 mol % of polymer units based on at least one fluorinated comonomer selected from the group consisting of fluorinated comonomes of the formulae (1), (2) and (3), (b) from 40 to 75 mol % of polymer units based on tetrafluoroethylene, (c) from 5 to 25 mol % of polymer units based on propylene, and (d) from 10 to 54.5 mol % of polymer units based on vinylidene fluoride.

5. The fluorine-containing copolymer according to claim 4, wherein the fluorinated comonomer of the formula (1) is (perfluorobutyl)ethylene or (perfluorooctyl)ethylene.

6. The fluorine-containing copolymer according to claim 4, wherein the fluorinated comonomer of the formula (2) is perfluoro(propyl vinyl ether).

7. The fluorine-containing copolymer according to claim 1, which comprises:

(a) from 0.2 to 5 mol % of polymer units based on at least one fluorinated comonomer selected from the group consisting of fluorinated comonomers of the formulae (1), (2) and (3), (b) from 45 to 75 mol % of polymer units based on tetrafluoroethylene, (c) from 8 to 20 mol % of polymer units based on propylene, and (d) from 10 to 40 mol % of polymer units based on vinylidene fluoride.

8. The fluorine-containing copolymer according to claim 7, wherein the fluorinated comonomer of the formula (1) is (perfluorobutyl)ethylene or (perfluorooctyl)ethylene.

9. The fluorine-containing copolymer according to claim 7, wherein the fluorinated comonomer of the formula (2) is perfluoro(propyl vinyl ether).

\* \* \* \* \*